(12) United States Patent
Molokhina et al.

(10) Patent No.: US 9,777,480 B2
(45) Date of Patent: Oct. 3, 2017

(54) MULTI-LINK CONSTRUCTION ELEMENT AND METHOD FOR ASSEMBLING SAME

(71) Applicants: Evgeny Vyacheslavovich Komrakov, St. Petersburg (RU); Larisa Arkadievna Molokhina, Moscow (RU); Alexandr Grigorievich Bekrenev, Moscow (RU)

(72) Inventors: Larisa Arkadievna Molokhina, Moscow (RU); Ilya Valerievich Molokhin, Moscow (RU); Olga Mikhailovna Kozlova, Balashikha Moskovskaya obl. (RU); Vera Alexandrovna Bekreneva, Moscow (RU); Roman Alexandrovich Bekrenev, Moscow (RU)

(73) Assignees: Evgeny Vyacheslavovich Komrakov, St. Petersburg (RU); Larisa Arkadievna Molokhina, Moscow (RU); Alexandr Grigorievich Bekrenev, Moscow (RU)

( * ) Notice: Subject to any disclaimer, the term of this patent is extended or adjusted under 35 U.S.C. 154(b) by 0 days.

(21) Appl. No.: 15/113,348

(22) PCT Filed: May 15, 2014

(86) PCT No.: PCT/RU2014/000347
§ 371 (c)(1),
(2) Date: Jul. 21, 2016

(87) PCT Pub. No.: WO2015/174884
PCT Pub. Date: Nov. 19, 2015

(65) Prior Publication Data
US 2017/0009454 A1    Jan. 12, 2017

(51) Int. Cl.
*E04C 5/00* (2006.01)
*E04C 5/01* (2006.01)
(Continued)

(52) U.S. Cl.
CPC .............. *E04C 5/01* (2013.01); *B60L 11/182* (2013.01); *E01C 5/08* (2013.01); *E01C 9/06* (2013.01);
(Continued)

(58) Field of Classification Search
CPC ..... E04C 5/01; E04C 5/07; E04C 5/06; E04C 5/08; E04C 5/085; E04C 5/12; E04C 2/00;
(Continued)

(56) References Cited

U.S. PATENT DOCUMENTS 2,378,584 A * 6/1945 Schorer .................. B28B 23/04
254/100
3,197,927 A * 8/1965 Fuller .................... E04B 1/3211
52/20
(Continued)

FOREIGN PATENT DOCUMENTS

| KR | 20030040874 A | 5/2003 |
| RU | 2331727 C1 | 8/2008 |
| RU | 112682 U1 | 1/2012 |

*Primary Examiner* — Brent W Herring
(74) *Attorney, Agent, or Firm* — Paul & Paul

(57) ABSTRACT

The present set of inventions relates to the field of building and in particular to building constructions and to processes for manufacturing building constructions comprising tensioned and non-tensioned tendons and can be used to construct residential, public and office buildings and constructions as well as for reconditioning or restoring the same. The technical result consists of the provision of relatively long-extended constructions or complicated shape construc- (Continued)

tions working as a single pre-tensioned construction and characterized by high carrying capacity, stability and rigidity.

Said technical result is obtained by the fact that in a multi-component building member comprising at least two components and pre-tensioned tendons, each component is made as a tendons module comprising an initial and a final supporting elements with holes for the pre-tensioned tendons and with a stand for placing anchors and tensioning arrangements; and a reinforcing cage located between said supporting elements and comprising an upper and a lower elements in the form of a grid with a cellular structure, the cells having the shape of an equilateral polyhedron, and at least one median element under the form of a space reinforcement structure comprising inclined reinforcement bars forming equilateral polyhedral pyramids oppositely oriented in space, the pre-tensioned tendons of the first component being anchored at the initial and final supporting elements of the same, the pre-tensioned tendons of each following component being anchored at the final elements of the previous and the current components.

Said technical result is obtained as well by the fact that in a process for assembling the multi-component building member, the median, the upper and the lower components of the tendons module are preassembled, attached between the initial and the final supporting elements, the tendons are inserted and then pre-tensioned, wherein, starting with the second tendons module of the construction, the anchor of the pre-tensioned tendons is mounted on the final supporting element of the previous tendons module, whereas a tensioning arrangement is mounted on the final supporting element of the pre-tensioned tendons module.

18 Claims, 3 Drawing Sheets

(51) Int. Cl.
*E01C 5/08* (2006.01)
*E04G 21/12* (2006.01)
*E04C 1/00* (2006.01)
*E04C 2/00* (2006.01)
*E04C 5/06* (2006.01)
*H02J 50/10* (2016.01)
*B60L 11/18* (2006.01)
*E01C 9/06* (2006.01)
*E04C 5/07* (2006.01)
*H05B 3/28* (2006.01)

(52) U.S. Cl.
CPC .................. *E04C 1/00* (2013.01); *E04C 2/00* (2013.01); *E04C 5/06* (2013.01); *E04C 5/07* (2013.01); *E04G 21/12* (2013.01); *H02J 50/10* (2016.02); *H05B 3/283* (2013.01); *E01C 2201/16* (2013.01)

(58) Field of Classification Search
CPC .......... E04C 1/00; H02J 50/10; B60L 11/182; E01C 9/06; E01C 5/08; E01C 5/10; E01C 5/105; E01C 2201/16; H05B 3/283; E04G 21/12; E04G 21/125; E04G 21/126
USPC ........... 52/223.1, 223.6, 223.7, 223.8, 223.9, 52/223.11, 223.12, 223.13, 223.14, 231, 52/573.1
See application file for complete search history.

(56) References Cited

U.S. PATENT DOCUMENTS

| | | | | | |
|---|---|---|---|---|---|
| 4,442,646 | A | * | 4/1984 | Prevedini | E04C 5/12 52/223.13 |
| 4,671,034 | A | * | 6/1987 | Rehm | E04C 5/12 52/223.13 |
| 5,134,821 | A | * | 8/1992 | Sadahiro | E04C 3/10 52/223.12 |
| 7,827,642 | B2 | * | 11/2010 | Han | E01D 2/02 14/74.5 |
| 8,555,518 | B2 | * | 10/2013 | Tooman | E02D 27/42 33/645 |
| 8,931,236 | B2 | * | 1/2015 | Sinclair | E02D 5/74 52/223.13 |
| 2012/0167499 | A1 | * | 7/2012 | Knisel | F03D 13/22 52/231 |
| 2012/0291394 | A1 | * | 11/2012 | Tooman | E02D 27/42 52/699 |
| 2015/0267408 | A1 | * | 9/2015 | Kurath-Grollmann | E04C 5/07 52/223.6 |

\* cited by examiner

12

12

MULTI-LINK CONSTRUCTION ELEMENT AND METHOD FOR ASSEMBLING SAME

FIELD OF THE INVENTION

The present set of inventions relates to the field of building and in particular to building constructions and to processes for manufacturing building constructions comprising tensioned and non-tensioned tendons and can be used to construct residential, public and office buildings and constructions as well as for reconditioning or restoring the same. The set of inventions can be used for manufacturing building constructions, mainly road, airport and floor slabs, including for precast-cast-in-place house building, pavement plates, tramway track slabs, railroad track slabs, metro track slabs, lintels, rafter beams, fencing structures such as wall panels including multi-layer panels, edge beams, beams for ceilings between floors, etc.

BACKGROUND OF THE INVENTION

It is known from prior art a structure of a prefabricated pavement disclosed in the patent RU 2379406, published on the 20 Jan. 2010, that comprises an earth, sand or other base; prestressed rectangular or square slabs attached to each other; joints filled with a sealing material and a nonrigid upper covering of asphalt or of cast bituminous concrete, characterized in that steel wire ropes are placed into through channels extended in the internal volume of the slabs at a distance of 0.7-2.0 m from each other (along the axes), the length of tightening and tensioned steel wire ropes being selected between 15 and 60 m; the mounting cavities for tie anchors and steel wire rope ends cast-in-place with concrete being made rectangular or square with the ratio of the width to the length in the limits of 1:1 to 1:4 of the slab thickness, the mounting cavities being kept open from above and limited below by the lower surface of the through channels before casting-in-place with concrete; the elastic elements are preferably made of rubber with the shape of cylinders or parallelepipeds with the cross-section having the surface equal to 4-20 surfaces of the cross-section of the through channels and with the length of 0.3 to 1.0 slab thickness, the thickness of the joints between the slabs being selected between 15 and 40 mm.

The drawbacks of such a construction are the impossibility of its use while building rather long structures under complicated geodesy conditions as well as low carrying capacity, stability, rigidity and crack resistance due to the need to manufacture the entire roadbed with separate tensioned elements the length of which is limited by the length of tensioned steel wire ropes.

The closest to the claimed multi-component building member, as regards the combination of the main essential features, is a multi-component concrete piece described in the international application WO 2011/065863 published on the 3 Jun. 2011, that contains in the body of the same some tensioned metal ropes and at least two hollow components made of concrete with internal tendons, and providing longitudinal through channels. Said components are attached to each other in series via a butt joint by means of said ropes each one of them being located inside said longitudinal channels and anchored at the non-adjoining butts of the components.

The drawbacks of such a construction are the impossibility to use the same while building rather long structures or complicated shape structures due to low carrying capacity, stability, rigidity and crack resistance of the entire construction, that are conditioned by the limited sizes of the prestressed construction; as a result, the entire construction is made assembled, and in the use of the same it does not function as a single prestressed structure but as a combination of different prestressed components.

It is known from the prior art a process of building an assembled roadway pavement disclosed in the patent RU 2379406 published on the 20 Jan. 2010. The process comprises laying prestressed rectangular or square reinforced concrete plates onto an earth, sand or other base, attaching the plates to each other in one or two mutually perpendicular directions by means of through tendons located in channels and further tensioned, closing the joints between the plates with a sealing material, covering the concrete base with asphalt or a cast bituminous concrete. In this case, the reinforced concrete plates are tied up into packages comprising 5 to 20 plates with steel wire ropes further tensioned with the force of 5 to 30 ton-forces per rope; elastic elements being inserted onto the ropes between the butts of the plates, the steel wire ropes being placed into through channels provided in the middle part of the plates and the ends of the ropes being fixed, after tensioning, with anchors in attachment cavities of the last plates in the packages, said cavities being further cast with concrete.

An inconvenient of said process is its low efficiency while building rather long constructions or complicated shape constructions since the limited length of tensioned steel wire ropes involves the manufacture of the entire construction assembled with separate tensioned components, and, as a result, the carrying capacity, stability, rigidity and crack resistance of the construction are lowered.

The closest to the claimed process, as to the combination of the main essential features, is a process of assembling a multi-component member described in the international application WO 2011/065863 published on the 3 Jun. 2011, that comprises the steps of using hollow concrete components with internal tendons, having longitudinal through channels, said components are oriented in the way to provide the location of said channels on one axis, the metal ropes are passed through the channels of the concrete components by means of a winch, tensioned with hydraulic jacks and anchored in the tensioned state on the non-adjacent ends of the components.

An inconvenient of said process is its low efficiency while building rather long constructions or complicated shape constructions since the manufacture of the entire construction assembled with separate tensioned members involves, as a result, lower carrying capacity, stability, rigidity and crack resistance of the construction.

SUMMARY OF THE SET OF INVENTIONS

The task to be solved by the present set of inventions is the provision of a pre-tensioned building member and of a process for assembling the same, that are characterized by high carrying capacity, stability and rigidity at low materials consumption and labor expenditures.

The solution of the task assigned provides for a technical result consisting of the provision of long-extended constructions or complicated shape constructions working as a single pre-tensioned construction and characterized by high carrying capacity, stability and rigidity.

Said technical result is obtained by the fact that in a multi-component building member comprising at least two components and pre-tensioned tendons, each component is made as a tendons module comprising an initial and a final supporting elements with holes for the pre-tensioned tendons and with a stand for placing anchors and tension arrangements; and a reinforcing cage located between said supporting elements and comprising an upper and a lower elements in the form of a grid with a cellular structure, the cells having the shape of an equilateral polyhedron, and at least one median element under the form of a space reinforcement structure comprising inclined reinforcement bars forming equilateral polyhedral pyramids oppositely oriented in space, the pre-tensioned tendons of the first component being anchored at the initial and final supporting elements of the same, the pre-tensioned tendons of each following component being anchored at the final elements of the previous and the current components.

Said technical result is obtained as well by the fact that the multi-component building member can be additionally provided with lateral supporting elements situated at the angle of $0°<\alpha<180°$ to the longitudinal axis of the building member with the provision of a preliminary tensioning in the direction at the angle of $0°<\alpha<180°$ to the longitudinal axis of the building member.

As pre-tensioned tendons, use is made of bar and/or rope tendons, tubular channel forming devices being provided for making the last.

At least one of the members of a tendons module can be made monolithic, whereas the upper and/or lower members and/or the reinforcement bars of the median member in a tendons module can be made of a metal or of composite materials on the basis of basalt or carbon, or of fiber glass, or of polymer materials, or of polymer materials with reinforcing additives. To add, the upper and/or lower elements are made with a possibility to attach panels.

The space between the reinforcement bars of the median member of the tendons module can be filled with a filler, in the capacity of which use can be made of concrete or polymer materials, or of polymer materials with reinforcing additives, or of soundproofing materials, or of heat-insulating materials. Besides, in the space between the reinforcement bars of the median member of the tendons module, tubes for supply lines can be placed, at least a part of the last being made with inspection holes to provide a possibility for mounting operations or for diagnosing the supply line condition; in addition, resources for contactless electromagnetic supply can be provided for electric cars moving on the roadbed, or means for heating a building member can be provided.

At least, a part of the reinforcement bars of the median element in the tendons module can be provided with free length parts to insure a contact with the cast-in-place or underlying layer.

Said technical result is obtained as well by the fact that in a process for assembling the multi-component building member, the median, upper and lower components of the tendons module are preassembled, attached between the initial and final supporting elements, the tendons are inserted and then are pre-tensioned, wherein, starting with the second tendons module of the construction, the anchor of the pre-tensioned tendons is mounted on the final supporting element of the previous tendons module, whereas a tensioning arrangement is mounted on the final supporting element of the pre-tensioned tendons module.

BRIEF DESCRIPTION OF THE DRAWINGS

The essence of the present set of inventions is illustrated by the drawings in which.

EMBODIMENTS OF THE SET OF INVENTIONS

Figure 1:
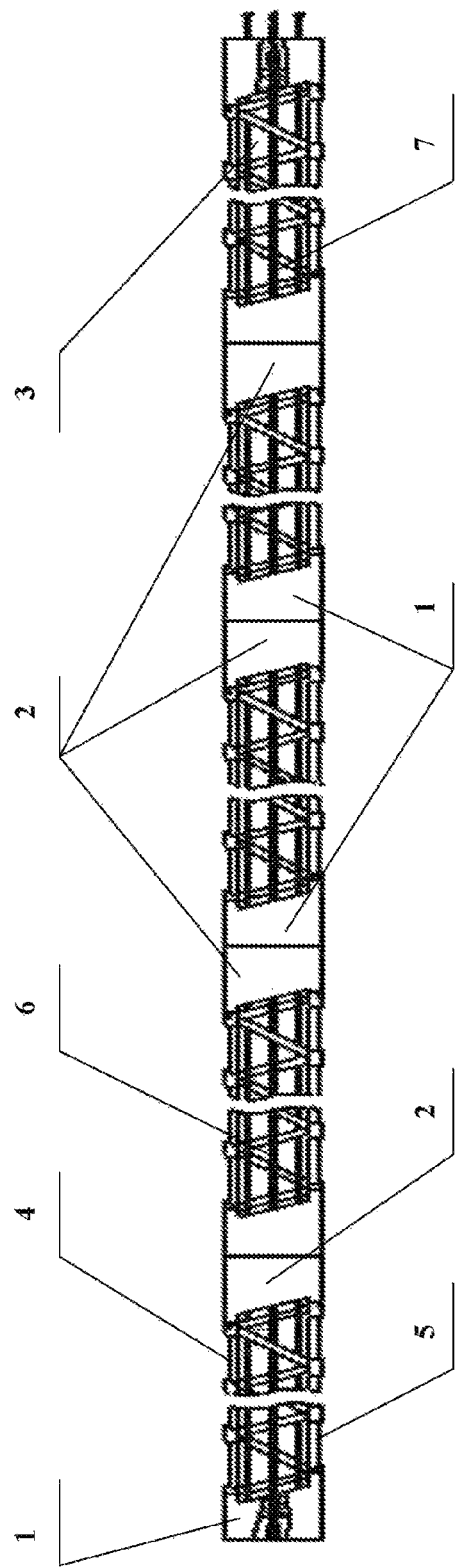
FIG. 1 shows a multi-component building member, side view.
Figure 2:
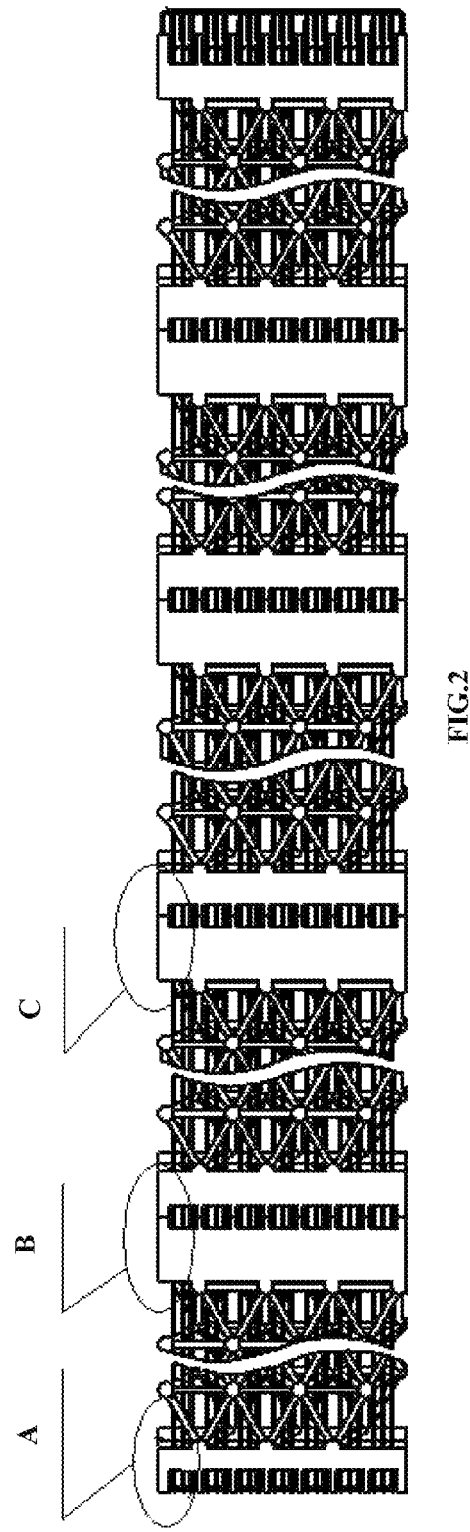
FIG. 2 shows a multi-component building member, top view.
Figure 3:
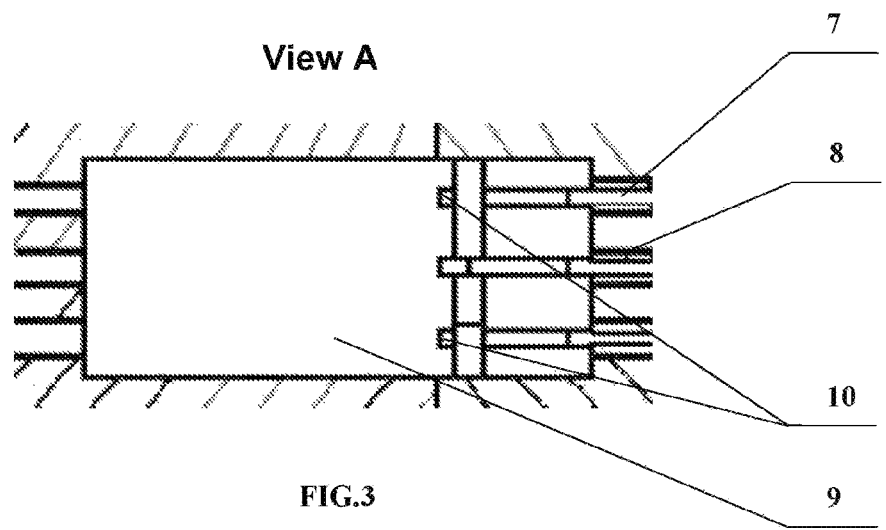
FIG. 3 shows the view A of FIG. 2.
Figure 4:
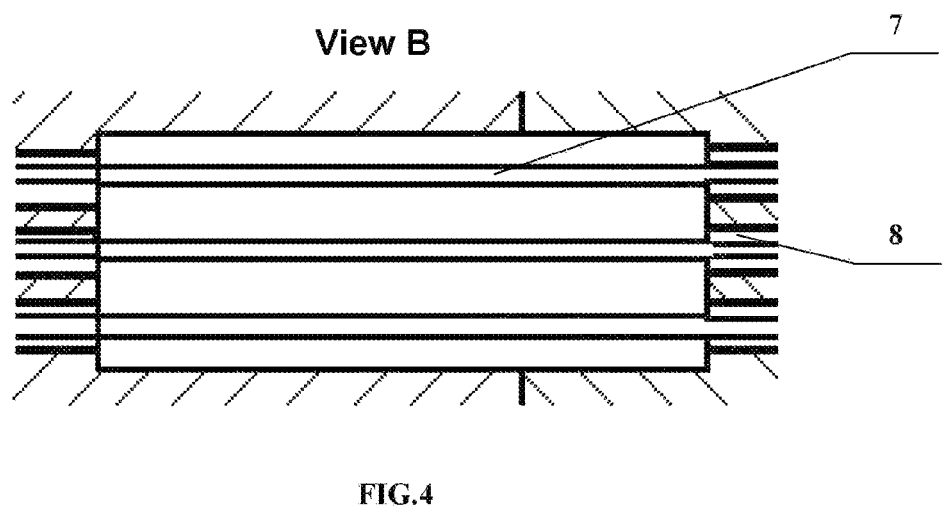
FIG. 4 shows the view B of FIG. 2.
Figure 5:
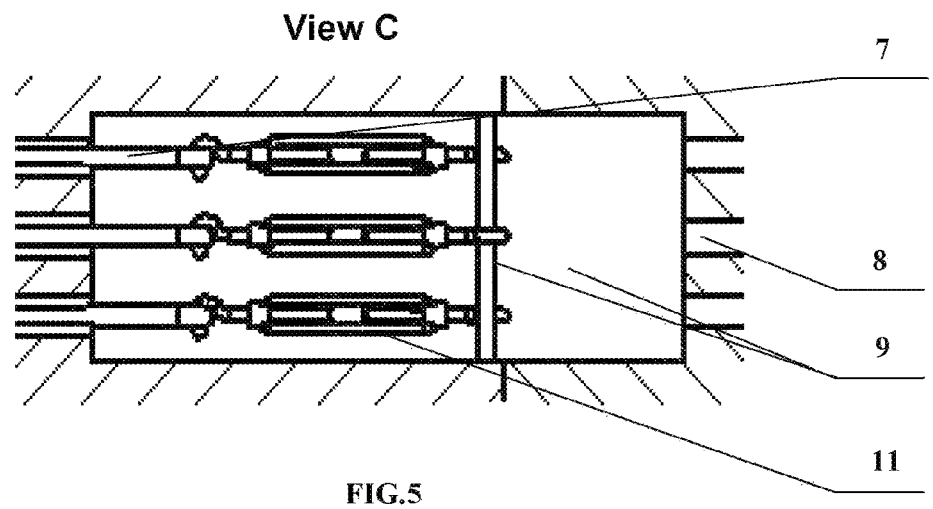
FIG. 5 shows the view C of FIG. 2.

A multi-component building member comprises at least two components and pre-tensioned tendons. The strength of the construction is determined by structural features of each member, by the mass-size characteristics of the same and by the quality of assembling.

Each member is made as a tendons module. The construction of the tendons module used in a multi-component building member comprises elements assembled according to the principle of preferable tetrahedron structures into a single unit. The tendons module comprises an initial (1) and a final (2) supporting elements and a reinforcing cage (3) located between said supporting elements and comprising an upper (4) and a lower (5) elements in the form of a grid with a cellular structure, the cells having the shape of an equilateral polyhedron, and at least one median element (6) under the form of a space reinforcement structure comprising inclined reinforcement bars forming equilateral polyhedral pyramids oppositely oriented in space. Thus, the load on the nodal points is distributed upon the axial guides of all the tendons elements. The reinforcing cage can be made of metal or of composite materials on the basis of basalt or carbon, or of fiber glass, or of polymer materials, or of polymer materials with reinforcing additives. Besides, at least one of the elements of the reinforcing cage can be made monolithic, when necessary.

The tendons modules are tensioned following the procedure of placing pre-tensioned tendons (7) that are further tensioned. For this purpose, the initial (1) and the final (2) supporting elements are provided with holes (8) for the pre-tensioned tendons and with a stand (9) for placing anchors (10) and tensioning arrangements (11). The pre-tensioned tendons of the first component are anchored onto the initial and final supporting elements of the same, whereas the pre-tensioned tendons of each following component are anchored onto the final elements of the previous and the current components. Besides, the loads are redistributed in all the combined components thanks to a diagram of the pre-tensioned tendons and to the transfer of said stresses onto the nodal elements of the cages to be coupled. The pre-tensioned tendons can pass in the cage in one or several directions simultaneously. The location of the pre-tensioned tendons in the tendons module and the value of the previous tensioning are determined by the project working loads of a multi-component building member during the operation of the same. The pre-stressed tendons are tensioned preferably perpendicularly to bending loads, whereas the points of placing the pre-stressed tendons, the number of members to be tensioned and the value of the pre-tensioning are determined by calculation or experimentally. The pre-stressed tendons in a tendons module can be distributed irregularly and can shift from the module center to the sides of maximal tensile stresses. The possibility to place the pre-stressed tendons in several directions provides the operation of the construction in the cases when there exist not only bending loads but loads combined with torque.

The construction of the supporting elements enables pre-stressing of pre-tensioned tendons both for individual tendons modules and for a joint tensioning of two or more tendons modules with the use of single pre-tensioned tendons, the stresses being transferred to the cage nodal elements only.

Arch structures are distinguished by a particular complexity in building for being submitted to a complex system of bending and torsional loads in various directions. A possibility to provide calculated prestressing of such structures with a strengthening effect of the same at the points of maximal stretching stresses will enable one to solve a lot of engineering tasks in the building of light-weight roofs, arch bridges, pedestrian overpasses, etc. To build arch structures with the prestress effect using single pre-tensioned tendons, the components to be linked are provided, in the linking planes, with bevels enabling an arcuated profile to an arch assembled with a multitude of components.

As pre-tensioned tendons, use can be made of bars and ropes of metal, polymers (carbon, Dacron), carbon plastics.

The structure of the supporting and stretching elements enables to carry out a repeated, complete or partial assembling of the construction as well as the tensioning adjusting and control of the pre-stressed tendons in operation.

The tendons cages are assembled (assembly from the left to the right) as follows:

1. Assembling the tendons cage that is fixed between the supporting elements.

2. At least one bar or wire rope of the pre-tensioned tendons is passed through a respective hole of the initial supporting element of the first tendons module and attached by an anchor on the initial supporting element. Then the pre-tensioned tendons are passed via the first and the following tendons modules through the holes of the final supporting element of the first module and the hole of the initial supporting element of the following module, and they are tensioned with a respective device, such as a turnbuckle.

3. Starting with the second tendons module in the structure, the anchor of the pre-tensioned tendons is installed onto the final supporting element of the previous tendons module and the stretching arrangement is installed onto the final supporting element of the tendons module being pre-tensioned, after that the tendons are tensioned with the help of a respective device, such as a turnbuckle.

4. The operations are further repeated. In this case, the right and left supporting elements of each module are butted up one against the other via supporting surfaces and transmit the stretching force to the entire assembly.

Such a sequence of the assembling procedure provides for building multi-component constructions long of many kilometers, for example a roadway, that operate like a single pre-tensioned structure, which is impossible at a different process of assembling due to the limitations imposed by the strength of pre-tensioned tendons and by the length of the same as well as by the complicated procedure of passing the pre-tensioned tendons through an assembled structure of many kilometers long. Besides, such an assembly can be disassembled at one section, for example, for repairs and then reassembled, when necessary, which is impossible when a roadway long of many kilometers is tensioned with single pre-tensioned tendons.

In the case when the tendons module is filled with a filler but when it is necessary to keep a possibility to disassemble and to reassemble the modules, tubular channel forming means are inserted into the tendons module through which the pre-tensioned tendons are passed.

To improve the operation of a construction having a single horizontal row of pre-tensioned tendons with the height of the last, the pre-tensioned tendons are shifted relative to the center of the tendons module in the direction of maximal bending loads. In the case of use of several horizontal rows of pre-tensioned tendons in the height of the last, the pre-tensioned tendons of each horizontal row can be stretched with a different force, the stressing force being increased in the direction of maximal bending loads (i.e. in the direction of the maximal bending).

Figure 6:
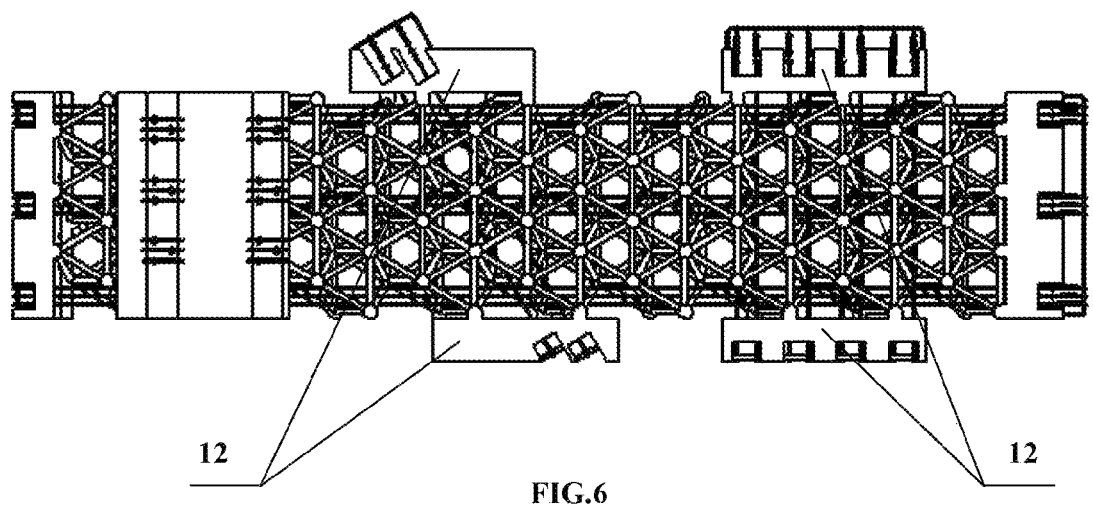
FIG. 6 shows a multi-component building member with a preliminary tension both across the tendons module and in a direction at the angle $0°<\alpha<180°$ to the longitudinal axis of the building member.
Figure 7:
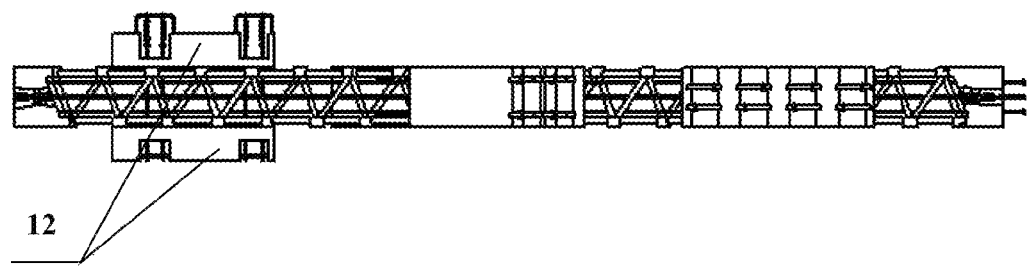
FIG. 7 shows a multi-component building member with a preliminary tensioning in a plane perpendicular to the plane of longitudinal tensioning the pre-tensioned tendons.

If during operation the construction is subjected not only to bending loads perpendicular to the tendons module plane, but torques are observed as well, the construction can be submitted to a pre-tensioning both across the tendons module and in a direction at the angle $0°<\alpha<180°$ to the longitudinal axis of the building member (FIG. 6), as well as in a plane perpendicular to the plane of longitudinal stretching of the pre-tensioned tendons (FIG. 7). In this case, the tendons module is additionally provided with respective supporting elements (12).

When it is necessary to provide bends (for example, a roadway turn or an ascending grade of the same) while keeping the effect of tensioning with single pre-tensioned tendons, the pads of the supporting elements are provided, in respective points of a tendons module, with a bevel in the necessary direction.

The main features of the constructions built on the basis of the described tendons module can be as follows:
 a uniform load distribution on the entire surface of the construction independently of the point of the load applied to the upper part of the construction: whether the load is distributed upon the whole surface or it is distributed only on the surface of a single cell;
 vibratory loads are dampened inside the construction itself.

The combination of these features enables one to eliminate the vibration problem, to reduce the road maintenance and repair costs, to improve the strength characteristics of runways together with a reduced cost of the same, to reduce the weight of wall and ceiling panels thanks to the use of lighter fillers, to provide seismic stability of buildings, to use cantilever building construction on slopes. All this highly improves ecological safety of the building and maintenance of roads together with the economy efficiency of the same.

The above features enable to use multi-component building members based on a tendons module in the highway, airport, building and other structures engineering.

The invention claimed is:

1. A multi-component building member comprising at least a first component and a second component and pre-tensioned tendons, characterized in that each component is made as a tendons module comprising an initial supporting element and a final supporting element with holes for the pre-tensioned tendons and with a stand for placing anchors and tensioning arrangements, and a reinforcing cage located between said supporting elements and comprising an upper element and a lower element in the form of a grid with a cellular structure comprised of cells, the cells having the shape of an equilateral polyhedron, and at least one median element in the form of a space reinforcement structure comprising inclined reinforcement bars forming equilateral polyhedral pyramids oppositely oriented in space, the pre-tensioned tendons of the first component being anchored at the initial and final supporting elements of the first component, the pre-tensioned tendons of the second component being anchored at the final elements of the first component and the second component.

2. A multi-component building member according to claim 1, the building member comprising at least one pair of second components, each pair of second components including an initial second component joined to a following second component, the pre-tensioned tendons of the following second component being anchored at the final elements of the initial second component and the following second component.

3. A multi-component building member of claim 2, characterized in that it is additionally provided with lateral supporting elements situated at the angle of $0°<\alpha<180°$ to the longitudinal axis of the building member with the provision of a preliminary tensioning in the direction at the angle of $0°<\alpha<180°$ to the longitudinal axis of the building member.

4. A multi-component building member of claim 2, characterized in that the use is made of bar tendons as pre-tensioned tendons.

5. A multi-component building member of claim 2, characterized in that the use is made of rope tendons as pre-tensioned tendons.

6. A multi-component building member of claim 5, characterized in that it is additionally provided with tubular channel forming devices for making the rope tendons.

7. A multi-component building member of claim 2, characterized in that at least one of the elements of the reinforcing cage is made monolithic.

8. A multi-component building member of claim 2, characterized in that the upper and/or lower elements and/or the reinforcement bars of the median element in a tendons module can be made of metal or of composite materials on the basis of basalt or carbon, or of fiber glass, or of polymer materials, or of polymer materials with reinforcing additives.

9. A multi-component building member of claim 2, characterized in that the volume between the reinforcement bars of the median element of the tendons module is filled with a filler.

10. A multi-component building member of claim 9, characterized in that as a filler, use can be made of concrete or polymer materials, or of polymer materials with reinforcing additives, or of soundproofing materials, or of heat-insulating materials.

11. A multi-component building member of claim 2, characterized in that the upper and/or lower elements are made with a possibility to attach panels.

12. A multi-component building member of claim 2, characterized in that in the volume between the reinforcement bars of the median element of the tendons module, tubes for supply lines are placed, at least a part of the last being made with inspection holes to provide a possibility for mounting operations or for diagnosing the supply line condition.

13. A multi-component building member of claim 2, characterized in that means for contactless electromagnetic supply are provided for example for supplying electric cars moving on the roadbed.

14. A multi-component building member of claim 2, characterized in that the building member is provided with means for heating the building member, located between the tendons of the median element in the tendons module.

15. A multi-component building member of claim 2, characterized in that at least a part of the reinforcement bars of the median element in the tendons module is provided with free length parts to insure a contact with the cast-in-place or underlying layer.

16. A process for assembling a multi-component building member of claim 1, characterized in that the median, the upper and the lower elements of the tendons module are preassembled, attached between the initial and the final supporting elements, the tendons are inserted and then are pre-tensioned, wherein, starting with the second tendons module of the construction, the anchor of the pre-tensioned tendons is mounted on the final supporting element of the previous tendons module, and a tensioning arrangement is mounted on the final supporting element of the pre-tensioned tendons module.

17. Assembling process of claim 16, characterized in that the pre-tensioning is additionally carried out in the direction at the angle of $0°<\alpha<180°$ to the longitudinal axis of the building member, the pre-tensioned tendons being placed into additional lateral supporting elements of the tendons module, located at the angle of $0°<\alpha<180°$ to the longitudinal axis of the building member.

18. Assembling process of claim 16, characterized in that the pre-tensioning is additionally carried out at least in a plane perpendicular to the plane of longitudinal tensioning.

* * * * *